E. BOURDON.
Pressure Gage.
No. 9,163.  Patented Aug. 3, 1852.
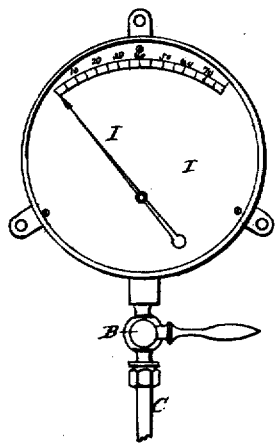
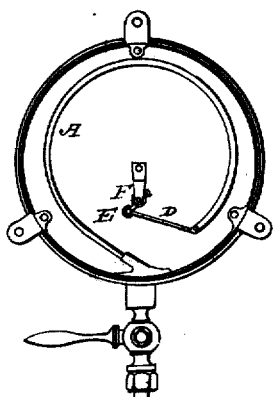
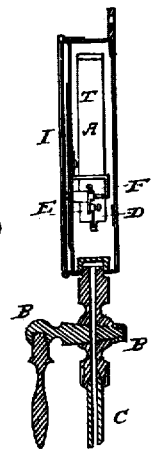
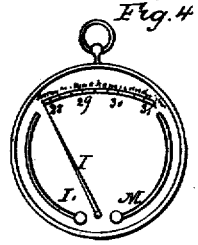
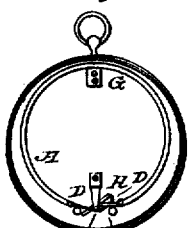
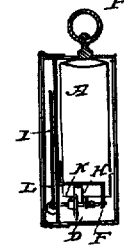
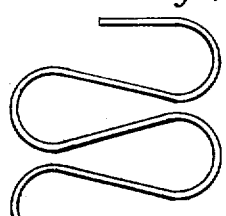
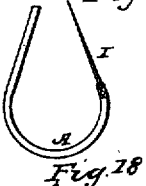
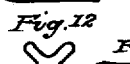
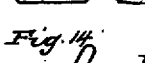
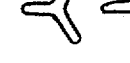
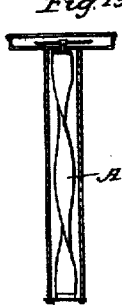

UNITED STATES PATENT OFFICE.

EUGENE BOURDON, OF PARIS, FRANCE.

PRESSURE-GAGE.

Specification of Letters Patent No. 9,163, dated August 3, 1852.

*To all whom it may concern:*

Be it known that I, the undersigned, EUGENE BOURDON, of Paris, in the Republic of France, engineer, a citizen of the Republic of France, have invented new and useful Improvements in Instruments for Measuring, Indicating, and Regulating the Pressure and Temperature of Fluids, of which the following is a full and exact description, reference being had to the accompanying drawing.

I have discovered that if a thin metallic tube be flattened and then bent or distorted from a straight line, it has the property of changing its form considerably when exposed to variations of internal or external pressure. An increase of internal pressure tends to bring the tube to a straight cylindrical form and the degree of pressure is indicated by the amount of alteration in the form of the tube.

Figure 1 represents a front view, Fig. 2 a back view and Fig. 3 a section of a pressure gage constructed on this principle and adapted for measuring and indicating the pressure of steam in steam boilers and for similar purposes. A is the flattened tube bent into a circular form and communicating by the cock B with a pipe C connected to the steam boiler. The other end of the tube A is closed and is attached by a link D to the lever E fixed on a small spindle F which carries the index I. The index moves over a graduated arc on the dial T. The pressure of the steam causes the tube A to unfold itself a little and this motion being multiplied by the lever causes the index I to move a proportional distance on the graduated arc. The arc is graduated by submitting the instrument to different pressures together with an ordinary mercurial pressure gage and marking the corresponding pressures on the dial. It will be found that for equal increments of pressure the degrees are equal or nearly so.

If the air be withhrawn from the interior of the tube A by means of an air pump or otherwise the curvature of the tube is increased and the index moves in the opposite direction and the instrument is then a vacuum gage.

If the air be withdrawn from the interior of the tube and it be then closed hermetically the curvature of the tube will vary with the pressure of the atmosphere and the instrument then serves as a barometer. Fig. 4 represents a front view of a barometer thus constructed. Fig. 5 is a back view and Fig. 6 a section of the same. A is the curved flattened tube fixed in the center at G and exhausted of air. The two branches of the tube are connected by two links D D to two short levers on the axis F of the index I. By this arrangement the two branches of the tube balance each other and the instrument may be placed in various positions without affecting the position of the index. The links D D are connected to two small pins attached to a bent piece of metal H which may be sprung open by screwing down the conical headed screw K. By this means the distance of the pins from the center of the axis may be adjusted and their leverage altered so as to adjust the index I to any required range. The index may also be shifted around on the axis and fixed by a small screw in any required position. The scale may thus be constructed independently of the rest of the instrument which is afterward adjusted to it by comparison with a good mercurial barometer.

L and M are two ordinary thermometers which may be added to the instrument to render it more complete or one of my improved thermometers hereinafter described may be added to the instrument so that its index may work on the same dial.

Figs. 7 to 14 inclusive represent various sectional forms which may be given to the tube and it will be easily understood that an infinite variety of forms may be given to the tubes provided that the section differs from a circle and the form from a straight line.

Fig. 15 shows a simple form in which the index I is at once fixed to the tube A without the intervention of a lever and axis.

Fig. 16 represents a tube bent into the form of a spiral. Fig. 17 shows another tube bent into the form of the letter S. One end of this tube being fixed, the other end will move in a straight line with variations of internal or external pressure.

Instead of distorting the tube by bending it into a curved form it may be twitsed as shown at A in Figs. 18 and 19. An increase of internal pressure causes the tube to untwist itself a little and the motion is shown by the index I moving over a graduated arc.

The motion of the tube may be communicated to the index in various ways as by a toothed sector and pinion or by a silk thread wound around the axis and kept tight by a spring.

These instruments may be applied in various ways to regulate the pressure of fluids. Thus I will suppose that it is required to maintain a regular pressure of steam in a chamber supplied from a steam boiler working at a higher pressure. For this purpose a pressure gage formed of a bent or twisted tube is placed in communication with the chamber and the closed end of the tube is attached by a link to a throttle valve in the pipe through which the steam enters. If the pressure of the steam in the chamber increases, the tube will unfold or untwist itself and partially close the throttle valve and if the pressure decreases the tube will become more curved or twisted and will open the throttle valve. If the curved or twisted tube be filled with alcohol or other liquid and closed hermetically the liquid will expand when heated and will contract when cooled and the amount of the expansion and contraction will be indicated by the motion of the index. The instrument thus becomes a thermometer and serves for measuring and indicating temperatures. It may be applied for regulating temperature in various ways. An instrument on this construction may be placed in an apartment the temperature of which is to be regulated and the bent or twisted tube may be connected to a throttle valve in a passage admitting cold air so that when the temperature of the apartment increases it may open the valve. Or the instrument may be connected to a throttle valve or damper in the flue of a stove so as to close the opening when the temperature exceeds any given point. The thickness of the tubes will depend on their other dimensions, on the amount of motion required, on the pressure to which they are to be exposed and on the material of which they are made, but I may observe that tubes made of brass of about one hundredth of an inch in thickness are suitable for barometers of about four inches diameter constructed like Figs. 4, 5 and 6. It will however be readily understood that the dimensions and forms admit of being varied and that the tubes may be made of other metals or other sufficiently elastic substances such as glass.

Having now described my invention I wish it to be understood that I claim—

The application of curved or twisted tubes whose transverse section differs from a circular form for the construction of instruments for measuring indicating and regulating the pressure and temperature of fluids substantially as above described.

EUGENE BOURDON.

Witnesses:
JOHN BARTLEY,
D. K. WEST.